March 8, 1927.  H. D. HAMILTON  1,620,018
MANUFACTURE OF SHOES
Filed Sept. 4, 1920
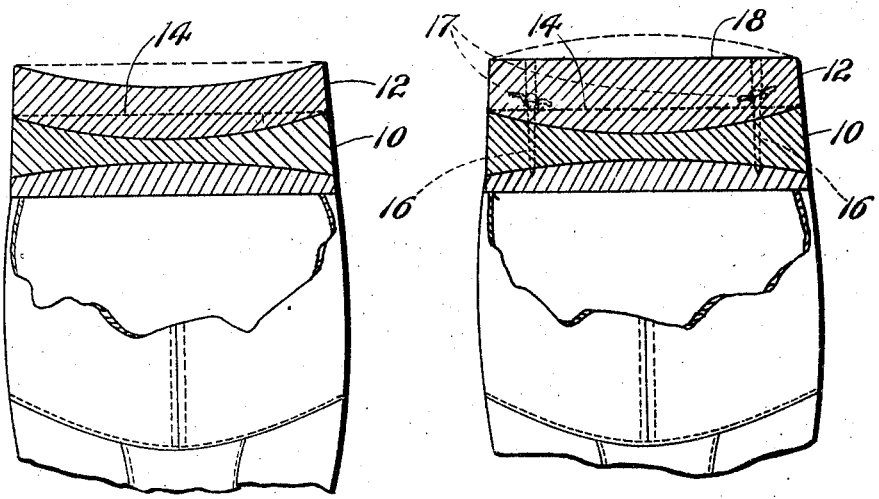
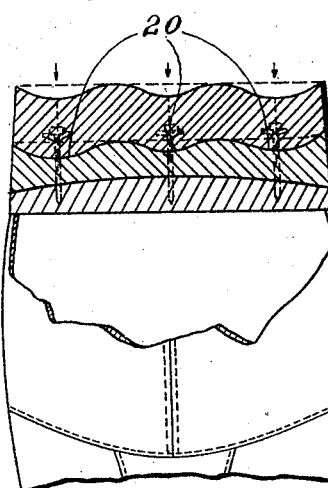
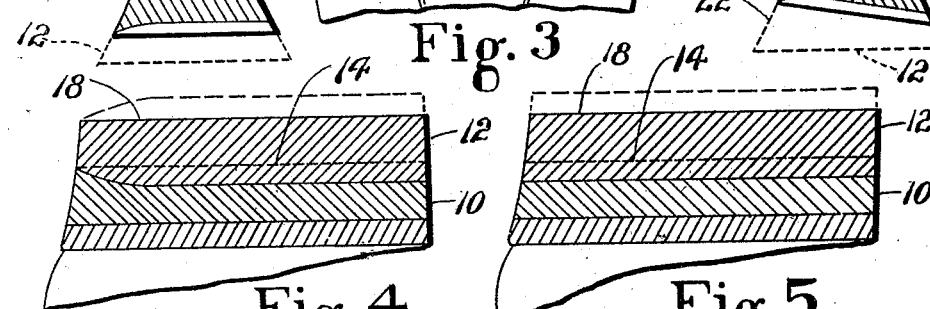
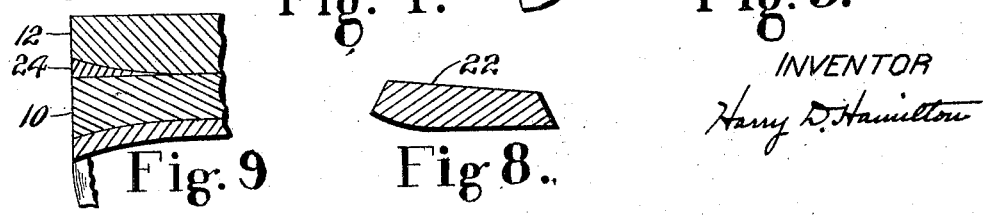
INVENTOR
Harry D. Hamilton Patented Mar. 8, 1927.

1,620,018

UNITED STATES PATENT OFFICE.

HARRY D. HAMILTON, OF WINTHROP, MASSACHUSETTS, ASSIGNOR TO UNITED SHOE MACHINERY CORPORATION, OF PATERSON, NEW JERSEY, A CORPORATION OF NEW JERSEY.

MANUFACTURE OF SHOES.

Application filed September 4, 1920. Serial No. 408,267.

This invention relates to the manufacture of shoes and more particularly to the attachment thereto of resilient tread members such, for example, as rubber heels.

It is an object of the invention to provide for the attachment of such tread members in a manner which will avoid the use of cement and at the same time will ensure a close and tight joint between the tread member and the base or section to which it is attached. As shown, this is accomplished by providing the base section with a concavely curved surface, preferably but not necessarily concave in both longitudinal and transverse directions, and by forming the tread member with a plane attaching surface, or at least with an attaching surface of such form that, without deformation, it will contact with the concavity of the base section only at the margin thereof. Then, when the tread member is secured to the base section, as for example, by nailing, the tread section may be deformed so that its attaching surface, or at least an extended area thereof adjacent to the periphery of the heel, will be brought into contact with and conformity to the concave surface of the base section, the resilience of the tread member ensuring a tight joint between the two parts.

In its different aspects the invention comprises a method of attaching resilient tread members to concave base members; a resilient tread member formed, prior to its attachment, with a median portion thicker than its marginal portions, or at least thicker than its lateral, marginal portions, and illustrated as having, prior to its attachment, a plane attaching surface and a convex tread surface, so that when attached it may be deformed to ensure a tight joint between the base section and the tread member and to present a plane tread surface; a base section provided with a concavely curved surface for the reception and deformation of the tread member; and a heel built up of a base section and a tread member assembled as hereinbefore described.

With the foregoing and other objects in view, the invention will now be described with reference to the accompanying drawings which show several illustrative embodiments of the heel and heel elements thereof, and pointed out in the subjoined claims.

Figs. 1, 2 and 3 are cross-sectional views showing different species of heels constructed in accordance with the present invention.

Fig. 4 is a longitudinal section of the species of Fig. 2.

Fig. 5 is a longitudinal section of still another species.

Figs. 6 and 7 illustrate, in longitudinal section, the invention as applied to Louis heels.

Fig. 8 is a longitudinal sectional view of the tread member of Fig. 7 prior to its application to a heel base section.

Fig. 9 is a cross section showing one way in which the concavity of the surface of the base section may be produced.

As shown in Figs. 1, 2, 4 and 5 of the drawing, the heel base 10 is concaved transversely, and preferably also longitudinally as shown in Fig. 4, though it is within the spirit of the invention to omit the longitudinal concavity and to so shape the heel base section that the line representing in cross section the surface thereof to which the tread member is to be attached will appear straight as indicated in Fig. 5. The tread member 12 of rubber or other suitable resilient material, is provided, prior to its attachment, with a preferably plane attaching surface 14, or at least with an attaching surface of such form that it will contact with the margin of the concave surfaces of the base section around the contour surface of the heel and will be spaced therefrom at the median portion thereof. In Figs. 1 to 5 inclusive the shape of the tread member prior to its attachment is indicated in broken lines.

The tread member 12 is secured to the base section 10 by suitable means indicated in Fig. 2 as nails 16 passing through washers 17 embedded in the tread member and is held in deformed condition by these securing means with its attaching surface contacting with the concave surface of the base section at least over an extended area adjacent to and surrounding the margin thereof. The tread member may have its tread surface, prior to its attachment to the base section, of such form that, when attached and deformed, it will present a plane surface as indicated at 18 in Figs. 2, 4 and 5, though it should be understood that this is not altogether essential since the advantages of the invention may be obtained to a substantial extent by the application to the concave surface of the base section of a tread member formed prior to its attachment with parallel plane surfaces. When such a tread member is used, it will, after the deformation caused by its attachment, present a concave tread surface which will, under some circumstances, act in the manner of a suction cup to prevent slipping.

In Fig. 3 the base section is indicated as provided with a corrugated surface forming a plurality of concave portions indicated at 20. The tread member 12 is applied thereto in the manner already described.

Figs. 6 and 7 show the invention as applied to a Louis heel. As indicated in dotted lines the tread member is of such form as after its attachment to complete the outline of the heel. As shown in Fig. 6, the outline of the base section is parallel to the plane of the outline of the tread member, whereas in the construction of Fig. 7 the tread member 22 is formed thicker towards its rear than at its forward portion, being, prior to its application to the heel, substantially of the cross-section shown in Fig. 8, this being for the purpose of increasing the length of life of the tread member by the provision of an additional thickness of rubber at the portion of greatest wear.

The concaving of the base sections may be performed in any suitable manner. If a base section is of leather or leather-board, it may be molded to the desired form during the compression of the heel member when the usual concavely curved attaching face is formed, or the surfaces may be shaped by gouging. If desired, the concave effect may be produced by applying to a plane surface of the base section a thin strip of material, of the form ordinarily used for a rand, as shown at 24 in Fig. 9. Where the invention is applied to a wood heel, it will be preferable to form the concavity by cutting away a portion of the wood of the heel.

It may be noted here that in the drawing the depth of the concave portion is exaggerated in order more clearly to illustrate the same.

When the tread member is secured to the base section, it is deformed to bring the attaching surface of the tread member into contact with the concave outer surface of the base section and the resilience of the tread member which causes it to resist deformation holds the edge of the tread member closely in contact with the base section and thus insures a tight joint between the two around the contour surface of the heel without the use of cement.

Having described my invention, what I claim as new and desire to secure by Letters Patent of the United States is:—

1. A shoe heel comprising a base section having a concavely curved surface and a resilient tread member secured thereto and deformed to bring its attaching surface into substantial conformity with the said concaved surface of the base section.

2. A shoe heel comprising a base section having a concavely curved surface and a resilient tread member secured thereto in such manner that its attaching surface contacts with the concave surface of the base section over an extended area adjacent to the margin thereof.

3. A shoe heel comprising a base section having a surface concavely curved in both longitudinal and transverse directions and a resilient tread member secured thereto in such manner that its attaching surface contacts with the concave surface of the base section over an extended area adjacent to the periphery thereof.

4. A shoe heel comprising a base section having a concavely curved surface and a resilient tread member attached thereto, said tread member being thicker at its median portion than at its lateral marginal portions and being held in deformed condition to present a substantially plane tread surface and to insure a tight marginal joint between the base section and the tread member.

5. A shoe heel comprising a base section having a concavely curved surface, a resilient tread member, and a plurality of metallic fastenings securing the tread member to the base section and holding the tread member with an extended area of its attaching surface adjacent to its margin deformed to conform to and contact with the concave surface of the base section adjacent to the margin thereof.

6. A heel base section having a concavely curved surface for the reception of a resilient tread member.

7. A heel base section having a surface curved concavely both longitudinally and transversely for the reception of a resilient tread member.

8. A tread member of resilient material having, prior to its attachment to a shoe, a plane attaching surface and a convex tread surface.

9. A tread member of resilient material having, prior to its attachment to a shoe, a plane attaching surface, and a tread surface convex in both longitudinal and transverse directions.

10. That improvement in the manufacture of shoes which comprises applying to a heel base portion having a concavely curved surface a resilient tread member having a substantially plane attaching surface and fastening said tread member to said base portion in such manner that the tread member is deformed and its attaching surface brought substantially into conformity with the concave surface of said base portion to insure a tight joint between the two parts.

11. That improvement in the manufacture of shoes which comprises forming a heel base portion of a shoe with a concave surface, applying to said concave base portion a resilient tread member having a plane attaching portion, and nailing said tread member to said base portion so as to deform said tread member to bring its attaching surface into substantial conformity with the concave surface of said base portion to insure a tight joint between the two parts without the use of cement.

12. That improvement in the manufacture of shoes which comprises forming a heel base portion of a shoe with a concave surface, applying to said concave base portion a resilient tread member having an attaching surface of such form as to contact with points at the periphery of said concave portion and to be spaced from the median part of said concave portion, and securing said tread member to said base portion in such manner that the tread member is deformed so that its attaching surface contacts with the concaved surface of said base member over an extended area adjacent to the periphery thereof.

13. That improvement in the manufacture of shoes which comprises forming a heel base portion of a shoe with a concave surface, applying to said concave base portion a resilient tread member having a plane attaching surface, and securing said tread member to said base portion in such manner that the tread member is deformed so that its attaching surface contacts with the concave surface of said base member to insure a tight joint between the two parts.

14. A shoe heel comprising a base section having both its inner and outer attaching faces curved and a resilient tread section, both attached to a shoe, the attached tread section presenting a substantially flat tread face and its inner, attaching face conforming substantially to the outer, curved, attaching face of the base section.

In testimony whereof I have signed my name to this specification.

HARRY D. HAMILTON.

CERTIFICATE OF CORRECTION.

Patent No. 1,620,018.                        Granted March 8, 1927, to

HARRY D. HAMILTON.

It is hereby certified that error appears in the printed specification of the above numbered patent requiring correction as follows: Page 2, lines 69 and 70, claim 1, for the word "concaved" read "curved"; and that the said Letters Patent should be read with this correction therein that the same may conform to the record of the case in the Patent Office.

Signed and sealed this 4th day of October, A. D. 1927.

Seal.                                                                   M. J. Moore,
                                                                   Acting Commissioner of Patents.